Jan. 9, 1940. W. TAMMINGA 2,186,083
LIQUID DISPENSER
Filed Nov. 23, 1938 4 Sheets-Sheet 1
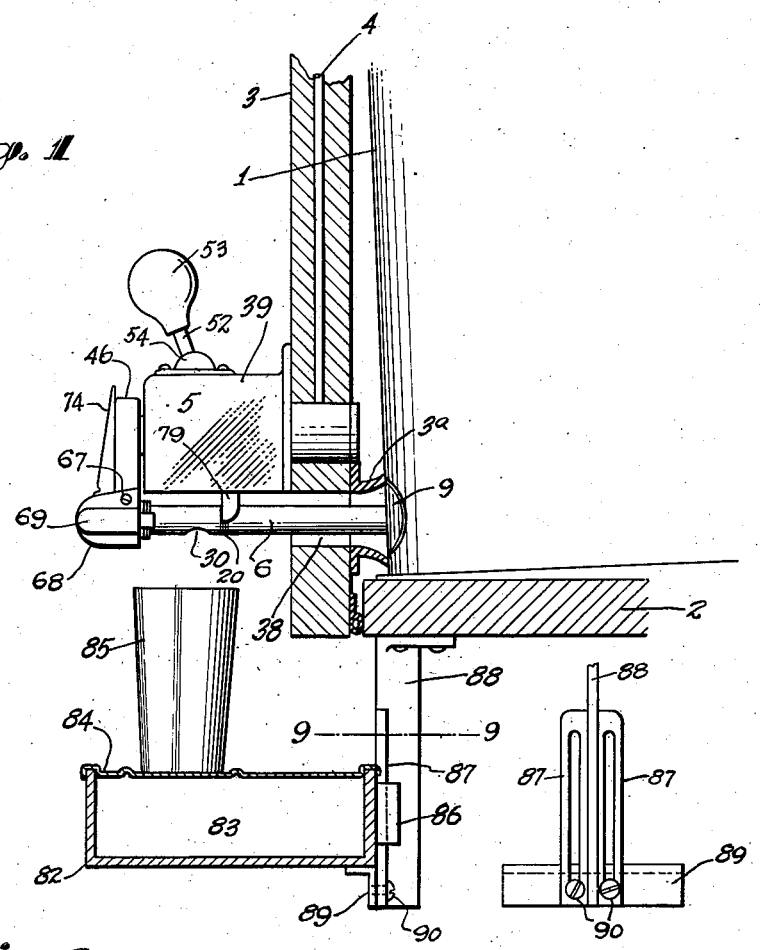
Fig. 1
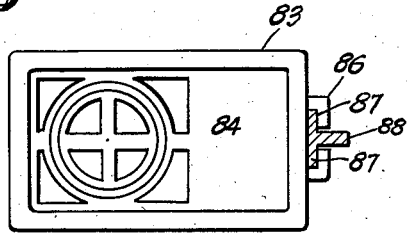
Fig. 9
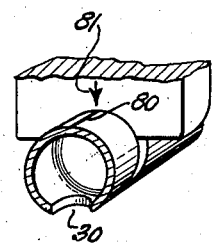
Fig. 10
Fig. 11
INVENTOR.
William Tamminga
BY Cornelius Zabriskie
ATTORNEY.

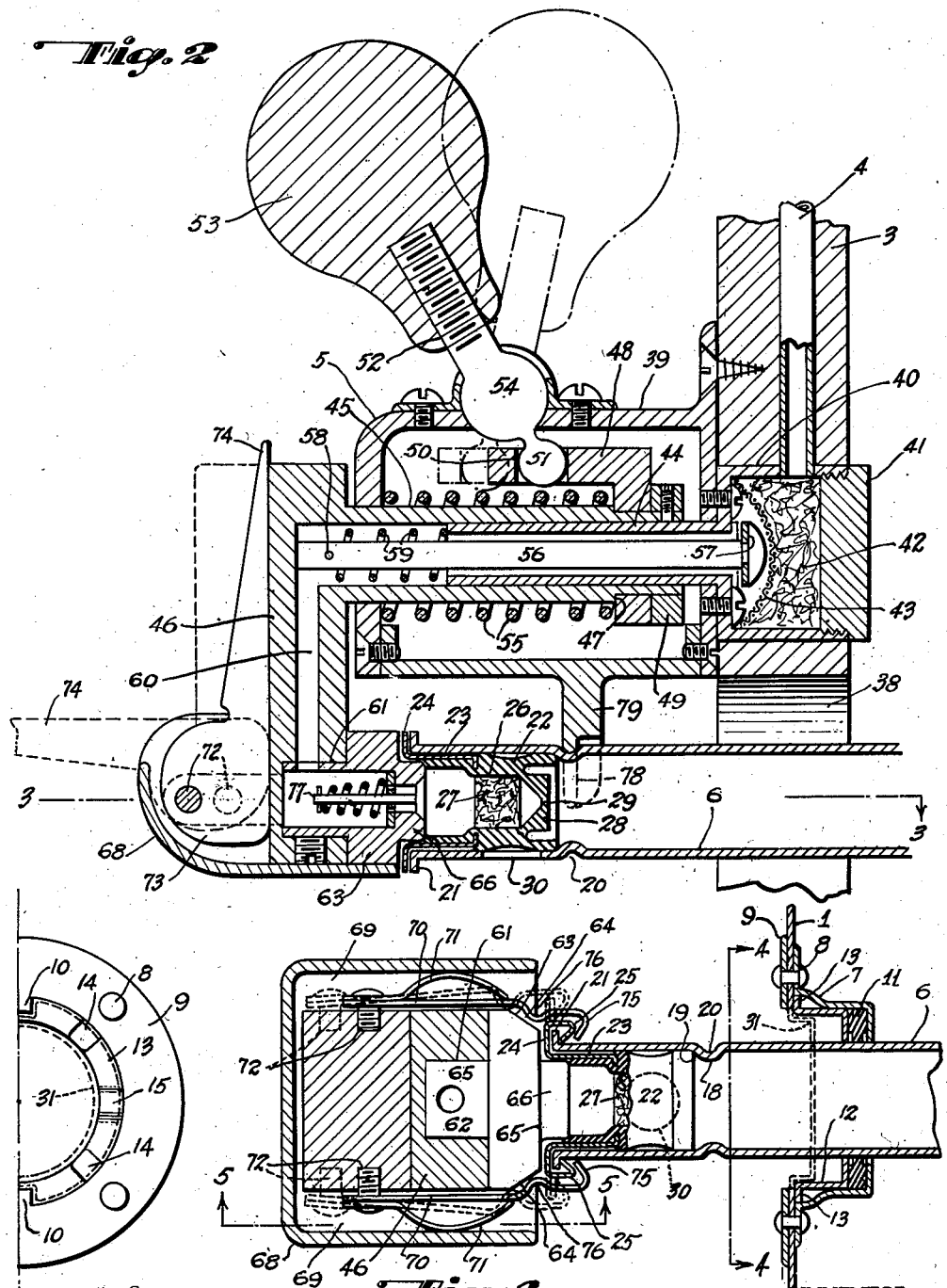

Jan. 9, 1940. W. TAMMINGA 2,186,083
LIQUID DISPENSER
Filed Nov. 23, 1938 4 Sheets-Sheet 3
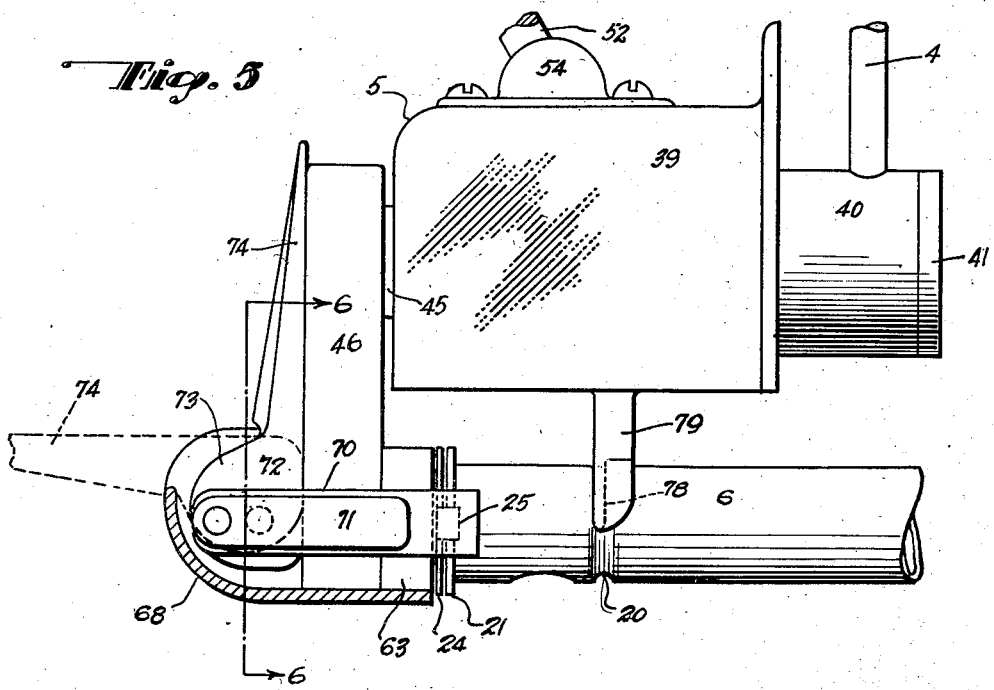
Fig. 5
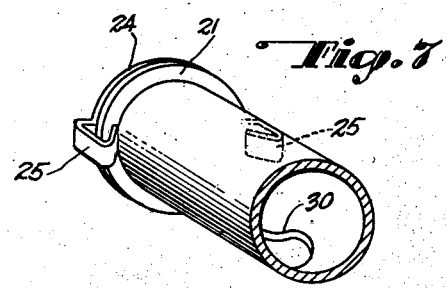
Fig. 7
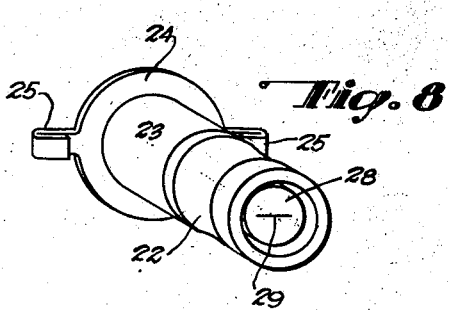
Fig. 6
Fig. 8
INVENTOR.
William Tamminga
BY Cornelius Zabriskie
ATTORNEY.

Jan. 9, 1940.    W. TAMMINGA    2,186,083
LIQUID DISPENSER
Filed Nov. 23, 1938    4 Sheets-Sheet 4

INVENTOR.
William Tamminga
Cornelius Zabriskie
ATTORNEY.

Patented Jan. 9, 1940

2,186,083

UNITED STATES PATENT OFFICE 2,186,083

LIQUID DISPENSER

William Tamminga, Bronx, N. Y., assignor to Monitor Process Corporation, a corporation of New Jersey Application November 23, 1938, Serial No. 241,899

20 Claims. (Cl. 221—67)

This invention relates to liquid dispensers and, while adapted for the dispensing of any liquid, is primarily designed for the dispensing of loose milk from large cans, such as are commonly used by farmers, creameries and wholesale dealers. The invention in this connection is adapted to be employed by retail dealers for the sale of milk by the glass, pitcher, or in other relatively small quantities.

The handling of loose milk presents many problems due to the fact that milk is readily contaminated and unless maintained in a thoroughly sterile state may seriously contribute to the spread of disease or become unpalatable. In view of these facts board of health regulations have placed stringent safeguards upon the handling of loose milk and require the most careful sterilization and cleaning of all parts which may come into contact therewith. It is the common practice to thoroughly sterilize and clean all containers in creameries, and wholesale milk handlers are thoroughly equipped to carry out these safeguards. Any structure therefore adapted for the purpose stated must provide for the thorough cleansing and sterilizing at the source of wholesale supply of all parts which will come in contact with the milk, as retail dealers cannot be depended upon to effectually carry out these precautions. The present invention is so constituted as to meet these requirements.

In accordance with this invention milk is adapted to be dispensed from a bulk container, such, for example, as the usual 40 quart can, by providing each can near its bottom with a dispensing tube which is mounted to slide through the wall of the can. During transit the tube is wholly contained within the can and the orifice through which it may be withdrawn is covered and closed by an appropriate dust cap which, when removed, will permit of the withdrawal of the tube to allow the liquid in the can to be conveniently dispensed through operation of a valve within the tube. The present invention provides a novel mounting for the tube in the wall of the can so as to insure against leakage in the sliding connection between these parts and the bottom of the can is formed to permit the complete discharge of the contents from the can.

The valve which is associated with the tube and by which the flow of milk therethrough is controlled, is of novel and unique construction. It is preferably so constituted as to be adapted for a single use. It is adapted, as hereinafter more fully explained, to be installed and locked into the tubing at the creamery and, after the parts are thus assembled, they are sterilized with the can, immediately before filling. Novel locking means are thus provided to hold the valve in place and it remains in the tube during shipment and in a condition wherein it is covered and protected by the dust cap until the can is set up at the retailer for dispensing operations. There the can is adapted to be received into a receptable or cabinet which is preferably of the refrigerating type and on the door of such cabinet is mounted valve operating means so constituted that they may be brought into cooperative relation with the valve to govern and actuate the same. With these valve operating means is associated a mechanism whereby the parts may be coupled together for conjoint operation, and the valve unlocked from the tube and made responsive to the valve operating means on the door while the tube is secured to the valve operating means in such a manner as to be held stationary while the valve is reciprocated to control the discharge of milk.

It is peculiar to milk that the cream content thereof tends to stratify in the upper portion of the milk and if milk is dispensed from the lower strata, a very unequal distribution of cream will necessarily result. It therefore is essential to the satisfactory dispensing of milk to agitate the same from time to time in order that the cream may be thoroughly distributed therethrough. This is accomplished in accordance with the present invention by introducing air into the bottom of the can through the valve into the discharge tube, by means of which the flow of the milk is controlled. But this invention is so constituted that, while air may be periodically introduced to effect agitation as specified, it cannot be introduced during a dispensing operation for, if this were possible, the even flow of milk from the container would be interrupted and splashing would result. With this construction therefore air, properly filtered, is periodically introduced into the can while the discharge valve is closed, but when the valve is opened, to allow the milk to flow, the air is automatically shut off and cannot again be fed into the can until the valve is closed.

This invention embodies numerous novel features of construction as will hereinafter appear from the following detailed description and they are all directed to the more efficient dispensing of milk and to the provision of certain safeguards which will insure not only satisfactory mechanical operation, but will thoroughly safeguard the milk against contamination from the time that it is received by the retailer until dispensed.

The accompanying drawings illustrate one practical embodiment of the invention, but the construction therein shown is to be understood as illustrative, only, and not as defining the limits of the invention.

Figure 1 is a fragmentary view showing the present invention partly in section and partly in elevation and illustrating a can in a cabinet with dispensing means associated therewith and adapted to dispense milk into a tumbler mounted on an adjustable support positioned therebeneath.

Figure 2 is a fragmentary vertical section taken centrally through the dispensing means, a portion of the cabinet door and a part of the outlet tube.

Figure 3 is a section on the line 3—3 of Figure 2 with certain of the parts in different positions of operation.

Figure 4 is a section on the line 4—4 of Figure 3 with the discharge tube in the container and covered and concealed by a dust cap.

Figure 5 is a section on the line 5—5 of Figure 3.

Figure 6 is a section on the line 6—6 of Figure 5.

Figure 7 is a fragmentary section perspective of the outer end of the outlet tube.

Figure 8 is a perspective view of the control valve.

Figure 9 is a section on the line 9—9 of Figure 1.

Figure 10 is a fragmental elevation of the tumbler holder and support as viewed from the right hand side of Figure 1.

Figure 11 is a fragmental perspective showing registering means whereby the outlet opening of the tube may be properly positioned to discharge milk in a vertical direction.

Figures 12, 13:
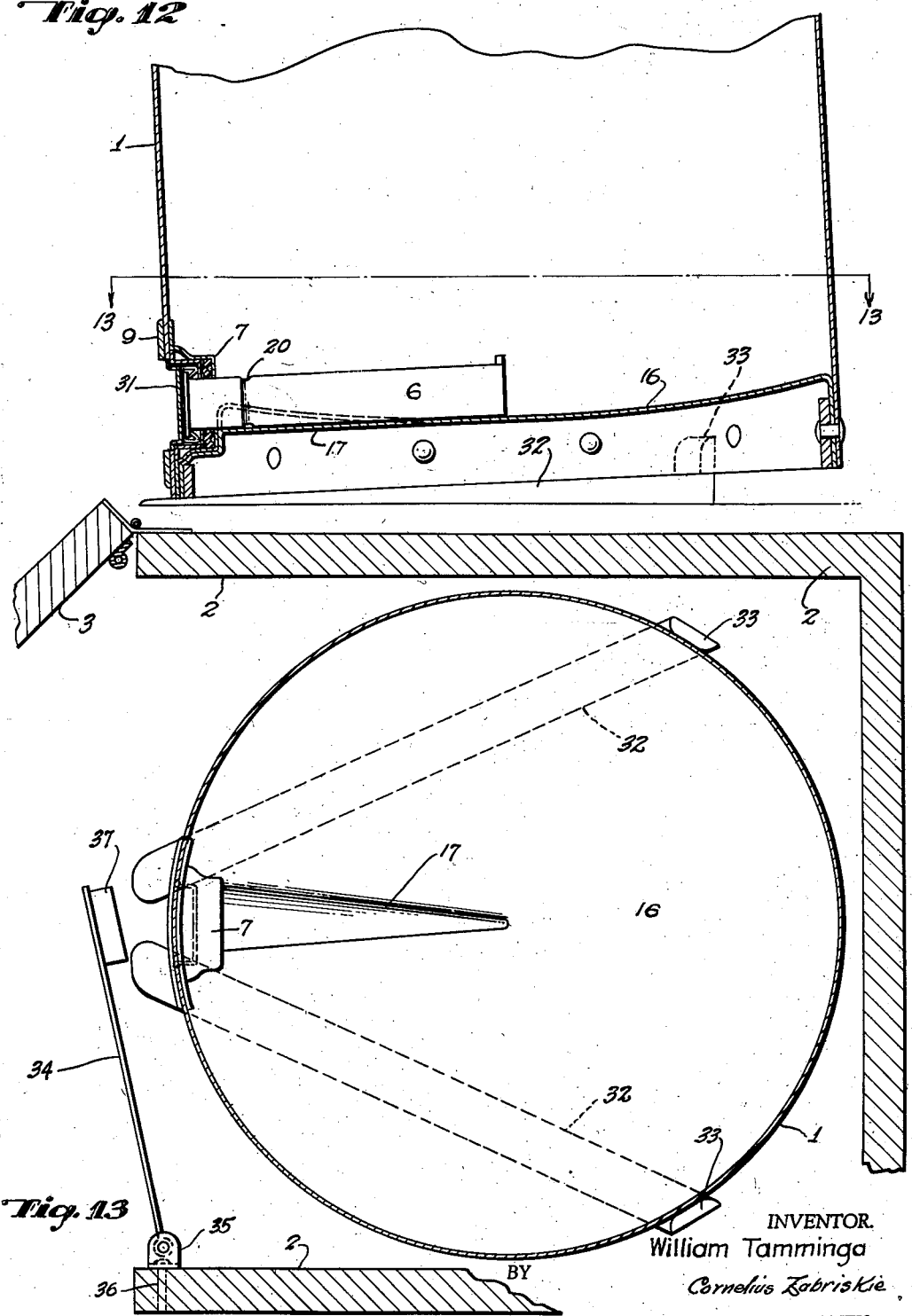
Figure 12 is a central vertical section of the lower portion of the milk can with an outlet tube associated therewith in accordance with this invention and the milk can being shown as being mounted in tilted position and properly located by means included in this invention.
Figure 13 is a section on the line 13—13 of Figure 12.

According to this invention a container 1, shown in Figures 1, 12 and 13 as a milk can, is housed within a casing or cabinet 2 provided with a door 3. This cabinet is preferably a refrigerator housing with which is associated an appropriate refrigerating unit to keep the milk cool. With the cabinet is associated an air circulatory system which serves to draw cool air from the interior of the cabinet and circulate it through a pipe 4 leading to the valve control means 5 whence it is led through a discharge tube 6 into the bottom of the can 1. I do not consider it necessary to show the entire casing or the entire can or the associated refrigerating and air circulating means in this application as these adjuncts are broadly disclosed in my copending application Serial No. 156,467, filed July 30, 1937. I will therefore proceed to point out more particularly the constructions wherein the present invention differs from the subject matter of my said prior application.

In mounting the discharge tube 6 for sliding movement within the wall of the can 1, considerable difficulty has been experienced in obtaining a leaf-proof joint while still permitting free sliding movement of the tube. This problem is solved by the construction shown best in Figure 3. The side wall of the can is provided with an opening somewhat larger than the tube and interiorly of this opening is mounted a sheet metal cup 7 having therein a central opening slightly larger than the diameter of the tube 6. This cup is secured to the wall of the can by rivets 8 which pass through said wall and also through a reinforcing ring 9 on the exterior thereof. The reinforcing ring has a central opening into which project two fingers 10 and the opening in the wall of the can is similarly shaped, so that the fingers 10 back up and reinforce corresponding fingers on the can wall. An elastic gasket 11 is adapted to be received within the cup 7 and to be placed under axial pressure by means of a stamped pressure member 12 having a peripheral flange 13. This flange has therein four cut-outs 14 which permit introduction of the pressure member into the cup when two of the cut-outs 14 are registered with the fingers 10 and between each two cut-outs the flange 13 is provided with a slightly depressed seat 15, whereby the pressure member may be rotated after insertion to bring the depressed seats 15 beyond the fingers 10, so that in this position the pressure member will be locked in place.

The gasket 11 is of some yielding resilient material, such as rubber. It is in the form of an annular ring adapted to be received within the cup 7 to be clamped between the base of said cup and the pressure member 13, so as to make liquid-tight joints between the gasket and the cup and the gasket and the pressure member. The inner periphery of said gasket is, however, provided with a relatively thin flange having a central opening somewhat smaller than the tube 6 which it is adapted to embrace, so that when the tube is forced through the gasket opening, this thin flange will grip the tube lightly and act somewhat after the manner of a squeegee as the tube is slid into and out of the can. This arrangement is much superior to a solid rubber gasket or solid packing within the packing space, for with such solid packings the tube is gripped too tightly if a leak-proof joint is required and said tube cannot be properly operated. The gasket which I have shown provides for a very nice free movement of the tube while insuring leak-proof joints.

As shown best in Figures 12 and 13 the tube is mounted very close to the bottom of the can and the can bottom 16 is depressed as shown at 17 so that the tube may practically lie in a flat radial portion and drain the entire contents of the can.

The tube has, intermediate its ends, an internal boss 18 (Figures 2 and 3) which provides an internal valve seat 19 and an external channel 20 and the outer end of the tube is flared outwardly to form a flange 21. Into the outer end of this discharge tube is adapted to be received a slide valve comprising a rubber sealing member or valve proper 22, permanently associated with a metal clip 23, these parts being vulcanized together, so that they cannot be taken apart. The metal clip 23 has a cylindrical portion to which the valve 22 is vulcanized and at the outer end of this cylindrical portion is an annular flange 24 provided with oppositely projecting bendable tongues 25. When the can is filled for shipment these tongues are bent over the flanges 21 of the tube 6, as shown in Figures 3 and 7, and serve to lock the clip and valve firmly within the outer end of the tube 6. The rubber part 22 is hollow to form therein a chamber 26 in which may be contained any suitable air filtering material 27. The outer end of the valve is open but the inner end thereof is closed by a boss-like wall 28 having therein a slit 29 which is normally closed due to the resiliency of the rubber and the shaping of the interior thereof.

It is to be noted that the slit 29 extends diametrically across the face of the boss 28 in a substantially straight line. The outer face of the boss is substantially flat, but the boss is cored out internally to provide a converging passage leading to the slit. Thus the walls of the boss at each side of the slit are materially thickened and taper in thickness toward the forward end of the valve, so as to render the opposite side walls of the slit substantially rigid. To open it is necessary therefore to stretch the rubber at the very ends of the slit and this can only be done by air pressure within the valve exerted against the tapering internal walls thereof. Air under pressure is able to open the slit and pass therethrough whereas hydrostatic pressure exerted against the external surfaces of the boss cannot bulge the boss inwardly to open the slit, but will, on the contrary, be exerted against the cylindrical lateral wall of the boss and will tend to hold the slit in closed position so that no leakage will occur. The slit 29 thus operates as a check valve to permit the supply of air into the discharge tube, but to preclude the passage of liquid through the valve.

When the valve is seated in the outer end of the tube, as shown in Figures 3 and 7, it serves to close a discharge port 30, formed in the wall of such tube and at the same time the rubber sealing element 22 of the valve bears against the seat 19 to form a double seal against leakage of milk. In this condition of the parts, the can is filled at the creamery with the tube pushed all the way into the can as shown in Figure 12 and with a dust cap 31 having a flange with cut-outs 31' to fit around the fingers 10 and covering and concealing the outer end of the tube, valve and wrench openings. The dust cap has a forced fit into the pressure member 12 and is frictionally held in place until withdrawn by a suitable tool. In this way the can may be shipped without any protruding projections which would be apt to be knocked off or damaged in shipment.

When received by the retailer it is adapted to be placed in the casing 2 upon guides 32 mounted on the base of the casing. These guides taper in thickness as shown best in Figure 12 and terminate at their rear ends in upstanding lugs 33. These serve to centralize the can within the casing, while the pitch of the guides 32 serve to tilt the can slightly forward to insure complete drainage. As presently described, the means for controlling the flow of milk through the tube is mounted on the door of the casing or cabinet 2 and in order to properly cooperate with this means, it is essential that the can be placed in the cabinet in appropriate position for such cooperation. It is for this reason that the lugs 33 are provided. They centralize the can within the cabinet but they do not insure the angular positioning of the tube with respect to the valve operating means on the door. This angular relation is not critical and it can be provided without the provision of positive means.

However, to insure absolute accuracy I may associate with the cabinet a positioning member 34, the same being hinged to the interior of one side wall of the cabinet on a bracket 35 which is also pivotal on a rivet 36. The member 34 is provided on its free end with a plug 37 of a size approximately the same as the depression in the dust cap 31 or pressure member 12 and the part 34 is of such length that, when the can is so angularly adjusted, the plug 37 will enter into either of the depressions referred to, the can will be in proper angular adjustment. After adjustment has been made, said adjusting devices may be pivotally moved out of the way so that the valve operating means can properly cooperate with the valve and tube.

The door 3 of the cabinet is provided with an opening 38 adapted to line up with the tube on a can positioned within the cabinet, and directly above this opening is mounted the housing 39 of the valve operating and air controlling mechanism. This housing 39 is permanently attached to the door and is mounted thereon and supported thereby. The structure is best shown in Figures 2, 3 and 5. Secured externally to the rear wall of the housing 39 is a chamber 40, received in a cut-out in the door and closed by a screw plug 41 accessible from the inside of the door. The air supply pipe 4 leads to this chamber and therein is contained suitable air filtering material 42 confined by a wire gauze or screen 43 bowed across the front wall of said chamber. Integral with the front wall of the chamber is a tubular guide 44 which extends through an opening in the rear wall of the housing and in a forward direction for an appreciable portion of the depth of the housing. Mounted to slide on this tubular guide with a close sliding fit is the tubular plunger 45 of a valve carrying arm 46 positioned on the exterior of the housing and depending from this plunger 45. The tubular plunger 45 has a close sliding fit through a hole in the front wall of the housing and is thus free for longitudinal reciprocation on the guide 44 while permitting swinging movement of the valve carrying arm on the axis of said guide.

The tubular plunger 45 is shouldered at 47 and a yoke 48 is clamped between said shoulder and a collar 49. Said yoke has therein an aperture 50 to receive the spherical end 51 of an operating lever 52 provided at its outer end with a handle 53 and pivoted to the housing by a ball joint 54. This permits of oscillation of the lever while excluding dust from entering the housing. A spring 55 interposed between the yoke and the forward wall of the housing normally tends to retract the plunger 45 of the valve carrying arm, whereas said plunger may be forced forwardly by manipulating the handle from the full line position thereof with sufficient force to overcome the power of the spring 55.

Extending through the tubular guide 44 with a fairly loose fit therein is the stem 56 of an air valve 57. This stem is provided near its end with a pin 58 and between the pin 58 and the end of the guide 44 is interposed a spring 59 somewhat lighter than the spring 55. The valve stem 56 is of such length that, when the plunger 45 is retracted by the spring 55, the forward end of the valve stem 56 will engage with the interior wall of the hollow valve carrying arm and compress the spring 59 sufficiently to force the valve 57 from its seat to permit air to pass from the chamber 42 to the valve carrying arm whereas, when the handle 53 is operated to force the valve carrying arm forwardly, the spring 59 will serve to seat the air valve. The purpose of this arrangement is to automatically control the feed of liquid agitating air, so that it cannot be fed to the discharge tube while the milk is being discharged. The full operation of the air control means will, however, be presently described.

The valve carrying arm 46 is cored out to provide a passage 60 which terminates in the lower portion of the arm in a round seat 61 extending into the arm from the rear face thereof. Into this seat projects the round stem 62 of a cam block 63, the same being locked in place by a set screw. The cam block is shown in plan view in Figure 3, although most of the other parts of this figure are in section and it will be noted therefrom that the cam block has lateral cam surfaces 64, a substantially plane rear face 65 and a boss 66 extending rearwardly from said rear face. This boss is so shaped and proportioned that it is adapted to project into the outer end of the tube and into the valve clip thereof to seat against the rubber valve part 22 and form therewith an air tight joint. The cam block is hollow and its rear wall is provided therein with an opening having a valve seat with which is associated a check valve 77.

Rigidly secured to the valve carrying arm by screws 67 shown in Figure 1 is a guide member 68. This guide member is provided at its opposite sides with guide channels 69, shown best in Figures 1, 3 and 6, and in these guide channels are positioned grippers 70, each of which is backed up by a leaf spring 71 which serves to normally force the grippers toward one another. The forward ends of the grippers are eccentrically secured by trunnions 72 to an eccentric member 73 having an operating handle 74. The rear ends of said grippers are hooked shaped as shown at 75 to cooperate with the locking fingers of the valve clip and, intermediate the ends of said grippers, they are offset to form knuckles 76 adapted to cooperate with the cam faces 64 of the cam block. By operating the handle 74 the eccentric member will cause the grippers to move longitudinally while the knuckles 76 coact with the cam faces 64, for the purpose of releasing the locking fingers 25 of the valve as presently described.

Operation

When the can of milk, with dust cap attached, is delivered to the retainer, the can is introduced into the cabinet through the open door, is centralized by the lugs 33, tilted by the guides 32 and angularly adjusted by the adjusting member 34. The dust cap is next removed and one can then reach in and draw out the discharge tube 6. After it has been withdrawn for the whole or a part of its length, the door is closed, causing the tube to project through the opening 38 in said door. As the door is closed it carries with it a rubber gasket 3a of flared form adapted to engage with the wall of the can so as to seal the opening 38 against the passage of warm atmospheric air into the cabinet 2 which is, in effect, a refrigerating cabinet. The flared form of the gasket 3a is such as to permit said gasket to adapt itself to slight irregularities in the can and to cans of various sizes, and form an effectual air seal therewith.

The tube is now withdrawn to its full extent and, while the handle 53 is held in the dot and dash line position of Figure 2, the annular channel 20 in the tube is engaged with a bead 78 of a bifurcated bracket 79 depending from the bottom of the housing 39. This holds the tube against withdrawal. The handle 53 is now released, permitting the spring 55 to move the valve carrying arm rearwardly, the handle 74 of the eccentric member meanwhile being in dotted line position of Figure 2. As the valve carrying arm moves to the rear toward the tube, the boss 66 of the cam block enters into the valve clip 23, while the grippers, being in rearward position as shown in full lines in Figure 3, ride idly over the locking tongues 25 of the valve clip, so that when the parts come to rest, they will appear as in this latter figure.

The next operation is the movement of the handle 74 from the dotted line position of Figure 2 to the full line position of Figure 2. This draws the grippers from the full line position of Figure 3 to the dotted line position thereof. During this operation, the grippers first engage with the locking fingers 25, so as to firmly hook over them and as the grippers retract, their knuckles 76 engage with the cam faces 64 which cause them to be separated, drawing the locking fingers 25 with them and finally forcing them into the flattened distorted condition shown in dotted lines in Figure 3 wherein they are fully disengaged from the flange 21 at the outer end of the discharge tube. The handle 74 of the eccentric member comes to rest in the full line position of Figure 2 with the valve clip firmly locked to the cam block and to the valve carrying arm on which said cam block is supported. Thereafter all movements of the valve carrying arm will be transmitted to the valve 22, while the discharge tube will be locked against longitudinal movement by the bead 78. The tube cannot be dislodged from this bead because the tube must be dropped down to be disengaged from the bead and it cannot drop down as long as the slide valve is supported by the carrier arm 46.

It is of course essential that the discharge orifice 30 in the discharge tube be positioned at the bottom. To insure of this the tube may be provided thereon with an indicator 80 on the tube which should be placed in registration with an indicator 81 on the part 79 as shown in Figure 11. This is accomplished by merely rotating the tube.

It should be noted that there is more or less inherent resiliency in the fingers 25 of the valve clip, so that the valve clip is locked to the valve operating arm in a more or less resilient fashion to compensate for slight irregularities which may be present due to quantity production of the parts. The grip is nevertheless positive and such parts cannot be displaced once they are engaged with one another.

It will be also noted that, when the parts are in the position shown in Fig. 2, the flattened forward face of the eccentric member 73 and its associated handle 74 will rest against the flat forward face of the valve carrying arm and that said eccentric will be on substantially dead centers, so that said eccentric member will be maintained in this position against inadvertent displacement. The resiliency of the fingers 25 on the valve clip hold the eccentric member in this position and permit it to assume and to leave such position when positively operated.

After the parts have been coupled together as specified the apparatus is ready for dispensing milk. The power of the spring 55 will normally hold the main discharge valve 22 in a position to cover the orifice 30 of the tube. In order to dispense milk it is only necessary to move the handle 53 from the full to the dot and dash line positions of Figure 2. This will cause the valve carrying arm to be moved forwardly carrying with it the main valve 22 which is secured thereto and, by so doing, the discharge orifice is uncovered and milk will flow therefrom. As soon as the handle 53 is released the spring 55 will retract the parts and move the discharge valve to closed position.

Through the medium of the air supply means to which I have hereinbefore referred, by reference, air under pressure is periodically supplied through the pipe 4, is filtered in the chamber 42 and then passes by the air valve 57 and through the passage 60 to the check valve 77 which it opens under such pressure. From this valve air passes through the filter 27 and through the check valve slot 29 of the main valve. The pressure is intermittent and air is supplied for a brief period and caused to pass through the tube 6 into the liquid for the purpose of agitating the same. It will be noted, however, that the air can pass only when the air valve 57 is unseated and this is only so when the main valve 22 is closed. Consequently air is free to pass so long as the main valve is closed, but as soon as the main valve is opened the air valve 57 is closed and no air can be admitted while the liquid is being dispensed. On the other hand no liquid can pass through the check valve slit 29 of the main valve for the hydrostatic pressure will operate upon the cylindrical sides of the boss 28, and tend to close and hold said slit closed. However, if for any reason that there is leakage at this point the check valve 77 will positively preclude the entrance of any liquid into the air channel back of this valve.

Liquid may be dispensed from the orifice 30 into a glass held in the hand, but I prefer to provide a tumbler holder 82 as shown in Figures 1, 9 and 10. This tumbler holder is in the form of a receptacle 83 having thereon a removable cover 84 on which a tumbler 85 may rest. The receptacle has a pair of hooks 86 at its back adapted to be engaged with the flanges 87 of a bracket 88 fixed on the under side of the cabinet. An adjustable shelf 89 controls the height of adjustment of the receptacle and this shelf may be locked in position by locking screws 90 shown best in Figure 10. By this adjustment the glass holder may be raised or lowered as desired and for cleaning the hooks may be lifted off of the flanges 87 and the holder washed in the usual manner. The cover 84 is also removable for this purpose.

After the entire contents of the can has been dispensed, it is necessary to replace the empty can with a new one. This is done in the following manner. The handle 74 is moved to the dotted line position of Figure 2, so that the grippers will release their grip on the locking tongues. Tube 6 is then grasped and rotated slightly so that the locking tongues are no longer in line with the grippers. The handle 53 is then pushed to the dot and dash line position of Figure 2 which will withdraw the grippers and the boss 66 of the cam block from engagement with the valve. The tube is then dropped down slightly to disengage it from the bead 78 and, having thus been released, is pushed into the can. The door of the cabinet can now be opened and the can removed and a new can substituted by following the procedure hereinbefore described. It is to be noted, however, that when the grippers are removed from the valve of the spent can the locking fingers of the main valve thereof are distorted and in such condition that the valve cannot be used again. Consequently when the can is received at the creamery for refilling, the old valve must be removed and discarded and the tube, can and associated parts are thoroughly sterilized and cleaned before a new and sterile valve is associated with the tube as hereinbefore described.

Having thus fully described the invention, what I claim as new and desire to secure by Letters Patent is:

1. In an assembly of the character described, a container provided with a discharge tube having a valve for controlling the discharge of liquod therethrough, and means for locking the valve to said tube with the valve in closed position, in combination with a casing for the container, means on the casing for actuating the discharge tube valve, and means for unlocking the valve from the tube and simultaneously coupling said valve to the valve actuating means on the casing.

2. In an assembly of the character described, a container provided with a discharge tube having a valve for controlling the discharge of liquid therethrough, and means for locking the valve to said tube with the valve in closed position, in combination with a casing for the container, means on the casing for actuating the discharge tube valve, and means also on the casing for unlocking the valve from the tube and simultaneously coupling said valve to the valve actuating means on the casing.

3. In an assembly of the character described, a container provided with a discharge tube slidable through the wall of the container and having a discharge port in the wall of the tube, a piston valve in said tube slidable to cover and uncover said port, means for locking the valve to the tube with said valve covering said port, in combination with a casing for the container, means on the casing for actuating the discharge tube valve, and means for unlocking the valve from the tube and simultaneously coupling said valve to the valve actuating means on the casing.

4. In an assembly of the character described, a container provided with a discharge tube slidable through the wall of the container and having a discharge port in the wall of the tube, a piston valve in said tube slidable to cover and uncover said port, and means for locking the valve to the tube with said valve covering said port, in combination with a casing for the container, means on the casing for actuating the discharge tube valve, means for unlocking the valve from the tube and simultaneously coupling said valve to the valve actuating means on the casing, and means for securing the tube to the casing against longitudinal movement.

5. In an assembly of the character described, a container provided with a discharge tube slidable through the wall of the container and having a discharge port in the wall of the tube, and a flange on the outer end of the tube, a piston valve in said tube slidable to cover or uncover said port, and bendable locking fingers on the valve engaging the flange on the tube to lock the valve in port covering position, in combination with a casing, means on the casing for actuating the piston valve, and means for disengaging the locking fingers from the tube flange and simultaneously coupling the piston valve to the valve actuating means on the casing.

6. In an assembly of the character described, a container provided with a discharge tube slidable through the wall of the container and having a discharge port in the wall of the tube, and a flange on the outer end of the tube, a piston valve in said tube slidable to cover or uncover said port, and bendable locking fingers on the valve engaging the flange on the tube to lock the valve in port covering position, in combination with a casing, means on the casing for actuating the piston valve, means for disengaging the locking fingers from the tube flange and simultaneously coupling the piston valve to the vlave actuating means on the casing, and means for securing the tube to the casing against longitudinal movement.

7. In an assembly of the character described, a container provided with a discharge tube slidable through the wall of the container into projecting position and having therein a valve, means on the valve for normalliy locking the valve to the tube in sealing position, a casing for said container, means supported on the casing for securing the tube, when in projecting position, to said casing, means also supported on the casing for unlocking the valve from the tube, and means also supported on the casing for actuating said valve.

8. In an assembly of the character described, a container provided with a discharge tube slidable through the wall of the container into projecting position and having therein a valve, means on the valve for normally locking the valve to the tube in sealing position, a casing for said container, a door on said casing provided with an opening through which the projecting tube may extend, means supported on said door for securing the projecting tube thereto, means also supported on the door for unlocking the valve from the tube, and means also supported on the door for actuating said valve.

9. In an assembly of the character described, a container provided with a longitudinally slidable discharge tube having a discharge valve, means on the valve for locking it to the tube, a casing enclosing the container and having a door provided with an opening through which said discharge tube is adapted to project, a housing supported on said door, means on the housing for holding the discharge tube against longitudinal movement, a plunger supported within the housing for oscillation and reciprocation, an arm rigid with said plunger, and means carried by said arm to unlock the valve from the tube and secure said valve to the arm, whereby reciprocation of the plunger will operate the valve while the tube remains stationary.

10. In an assembly of the character described, a container provided with a longitudinally slidable discharge tube having a discharge valve, a casing enclosing the container and having a door provided with an opening through which said discharge tube is adapted to project, a housing supported on said door, means on the housing for holding the discharge tube against longitudinal movement, a plunger supported within the housing for oscillation and reciprocation, an arm rigid with said plunger, means carried by said arm to secure the valve thereto, whereby reciprocation of the plunger will operate the valve, there being an air passage leading through the plunger and arm to the discharge tube, a check valve to preclude the entrance of liquid from the tube into said passage, means to supply air under pressure to said passage, and an air control valve for the passage, said air control valve and plunger being interconnected to maintain the air valve closed when the discharge valve is open and to open the air valve when the discharge valve is closed.

11. In an assembly of the character described, a container adapted to hold liquid and provided with an outlet tube through which such liquid may be discharged from a point below its surface, a discharge valve for controlling the discharge of liquid through said tube, means for operating said valve, there being an air passage leading through said valve and through which air may be conducted to the interior of the outlet tube to be there discharged into the liquid in said tube, a check valve to preclude the entry of liquid from the tube into said passage, means to supply air under pressure to said passage, an air control valve for said passage, and means for interconnecting the air control valve and the liquid discharge valve to maintain the air control valve closed when the liquid discharge valve is open and the air control valve open when the liquid discharge valve is closed.

12. In an assembly of the character described, a container adapted to hold liquid and provided with an outlet tube through which such liquid may be discharged from a point below its surface, a discharge valve for controlling the discharge of liquid through said tube, means for operating said valve, there being an air passage leading through said valve and through which air may be conducted to the interior of the outlet tube to be there discharged into the liquid in said utbe, a check valve to preclude the entry of liquid from the tube into said passage, means to supply air under pressure to said passage, an air control valve for said passage, means for interconnecting the air control valve and the liquid discharge valve to maintain the air control valve closed when the liquid discharge valve is open and the air control valve open when the liquid discharge valve is closed, and an air filter in said passage to remove foreign matter from the air passing therethrough.

13. In an assembly of the character described, a container provided with a discharge tube having therein a slide valve for controlling the discharge of liquid therethrough and having a resilient piston, in combination with a casing for the container, means on the casing for actuating the discharge valve, there being an air passage leading through the valve actuating means on the casing and through the discharge valve through which air may be conducted to the interior of the outlet tube to there be discharged into the liquid in said tube, and means for coupling the valve in the tube to the valve actuating means on the casing with the latter forming an air-tight joint against the resilient piston of the valve.

14. In an assembly of the character described, a casing having a door provided thereon with valve operating means, a container adapted to be positioned within said casing and having a valve, means within the casing to bodily locate the container therein with respect to the valve operating means, and means to angularly locate the container to insure alinement of the valve on the container with the valve operating means on the door of the casing when said door is closed.

15. In an assembly of the character described, a casing having a door provided thereon with valve operating means, a container adapted to be positioned within said casing and having a valve, means within the casing to bodily locate the container therein with respect to the valve operating means, and inclined guides within the casing to guide the container into engagement with the container locating means and to support said container in predetermined tilted position.

16. In an assembly of the character described, a container, a discharge tube slidable through the wall thereof and provided at its outer end with a flange and having an outlet port in the wall of the tube in spaced relation to said flange, a metal clip slidably fitted into the outer end of said tube and having locking ears engaging the flange of the tube to lock the clip thereto, and a plunger valve anchored to the clip and overlying the outlet port in the tube to seal the same.

17. In an assembly of the character described, a container, a discharge tube slidable through the wall thereof and provided with a port intermediate its ends, a slide valve to open and close said port, and means on the valve for detachably locking the slide valve in port closing position.

18. A valve comprising a hollow rubber piston open at one end and closed at the other end by a wall having thereon an external boss of less diameter than the diameter of the piston and provided diametrically across the end of the boss with a slit normally closed by the resiliency of the rubber of said valve, the side walls of the valve being tapered in thickness from the lateral edges of the slit toward the open end of the valve for an appreciable part of the length of the valve.

19. A valve comprising a hollow rubber piston open at one end and closed at the other end by a wall having thereon an external boss of less diameter than the diameter of the piston and provided diametrically across the end of the boss with a slit normally closed by the resiliency of the rubber of said valve, the side walls of the valve being tapered in thickness from the lateral edges of the slit toward the open end of the valve for an appreciable part of the length of the valve, and air filtering material housed within the confines of the valve.

20. A valve clip comprising a tubular cylindrical section provided at one end with means to attach the same to a valve, and having, at its other end, an integral, external flange with bendable tongues extending outwardly therefrom.

WILLIAM TAMMINGA.